(12) United States Patent
He et al.

(10) Patent No.: US 11,921,711 B2
(45) Date of Patent: Mar. 5, 2024

(54) TRAINED SEQUENCE-TO-SEQUENCE CONVERSION OF DATABASE QUERIES

(71) Applicant: Alibaba Group Holding Limited, Grand Cayman (KY)

(72) Inventors: Yifan He, Newark, CA (US); Qiong Zhang, Mountain View, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 395 days.

(21) Appl. No.: 16/811,980

(22) Filed: Mar. 6, 2020

(65) Prior Publication Data

US 2021/0279235 A1 Sep. 9, 2021

(51) Int. Cl.
*G06F 16/242* (2019.01)
*G06F 16/21* (2019.01)
*G06F 16/33* (2019.01)
*G06F 40/211* (2020.01)
*G06F 40/284* (2020.01)
*G06N 20/00* (2019.01)

(52) U.S. Cl.
CPC ........ *G06F 16/2433* (2019.01); *G06F 16/211* (2019.01); *G06F 16/3335* (2019.01); *G06F 40/211* (2020.01); *G06F 40/284* (2020.01); *G06N 20/00* (2019.01)

(58) Field of Classification Search
CPC .. G06F 16/243; G06F 16/3335; G06F 16/211; G06F 40/284; G06F 40/211; G06N 20/00
See application file for complete search history.

(56) References Cited

U.S. PATENT DOCUMENTS 9,934,309 B2 4/2018 Neeman
RE46,973 E * 7/2018 Mohan .................. G06F 16/284
 706/11
10,360,507 B2 7/2019 Aravamudan
(Continued)

OTHER PUBLICATIONS

He, et al., "System and Method for Quering Relational Databases with Natural Launguage Based on Structural Attention", retrieved from https://arxiv.org/pdf/1806.08730.pdf, on Mar. 3, 2020, 23 pages.
(Continued)

*Primary Examiner* — Yuk Ting Choi
(74) *Attorney, Agent, or Firm* — Lee & Hayes P.C.

(57) ABSTRACT

Methods and systems are provided for sequence-to-sequence conversion from unstructured search queries to structured database queries, so that lay persons may retrieve information from relational databases without specialized knowledge of database query languages. An encoder module and a decoder module of a learning model are trained to convert an unstructured search query to an intermediate feature vector by computing co-attention and self-attention based on a context string and a database schema, encoding the database schema in the context string by application of self-attention between the context string containing tokens of the database schema with learned structural attention heads which relate the token to logic of the database. Training is performed using labeled training datasets which include structured database queries which are normalized by parsing into a semantic representation thereof, followed by linearization.

20 Claims, 8 Drawing Sheets

(56) References Cited

U.S. PATENT DOCUMENTS

| | | | |
|---|---|---|---|
| 2003/0187587 A1 | 10/2003 | Swindells | |
| 2008/0077570 A1 | 3/2008 | Tang | |
| 2008/0208830 A1 | 8/2008 | Lauckhart | |
| 2015/0052084 A1* | 2/2015 | Kolluru | G06F 16/90335 706/11 |
| 2018/0101621 A1 | 4/2018 | Lewak | |
| 2018/0336202 A1* | 11/2018 | Jahanbakhsh | G06F 16/248 706/11 |
| 2019/0065545 A1 | 2/2019 | Hazel | |
| 2019/0205445 A1* | 7/2019 | Yazdani | G06F 16/252 706/11 |
| 2019/0251431 A1* | 8/2019 | Keskar | G06F 16/3344 707/999.003 |
| 2019/0266170 A1 | 8/2019 | Hazel | |
| 2019/0272296 A1 | 9/2019 | Prakash | |
| 2019/0355270 A1* | 11/2019 | McCann | G06F 40/30 707/999.003 |
| 2020/0167427 A1* | 5/2020 | Filoti | G06F 16/3325 706/11 |
| 2022/0237263 A1* | 7/2022 | Yamada | G06F 17/16 |

OTHER PUBLICATIONS

McCann, et al., "The Natural Language Decathlon: Multitask Learning as Question Answering", Jun. 20, 2018, retrieved from https://arxiv.org/pdf/1806.08730.pdf, 23 pages.

* cited by examiner

TRAINED SEQUENCE-TO-SEQUENCE CONVERSION OF DATABASE QUERIES

BACKGROUND

In database management, relational databases store information in the form of records which may be organized by relations. Subsets of data may be retrieved from relational databases by requesting data according to attributes and values or ranges of values thereof which encompass a subset of the data therein. However, the values or ranges of values of particular attributes which encompass the requested data must generally be described using structured relational database query languages.

Structured Query Language ("SQL") is a leading relational database query language. The formation of queries in SQL requires specialized training in SQL syntax, as well as knowledge of the particular schema of an individual database being queried. Although SQL queries are powerful for extracting information from databases, lay persons generally cannot quickly grasp the syntax required to write queries independently, and, even upon understanding the basics of SQL syntax, may still be unable to construct sophisticated queries.

Moreover, lay persons may not be able to quickly and intuitively understand the schemas of relational databases. For example, records may be organized over multiple tables, between which records may be related to each other by shared keys. Awareness of these features of the schema is necessary in order to construct queries. However, intuitively, lay persons may not be aware of this type of organization schema as featured in relational databases. Furthermore, the organization of data into tables may be unintuitive to lay persons, as which information is located in which table may appear to be arbitrary.

Consequently, it is desirable to provide solutions for lay persons to intuitively query a relational database for information without needing to be trained in constructing structured queries, and without needing to be aware of the database schema.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
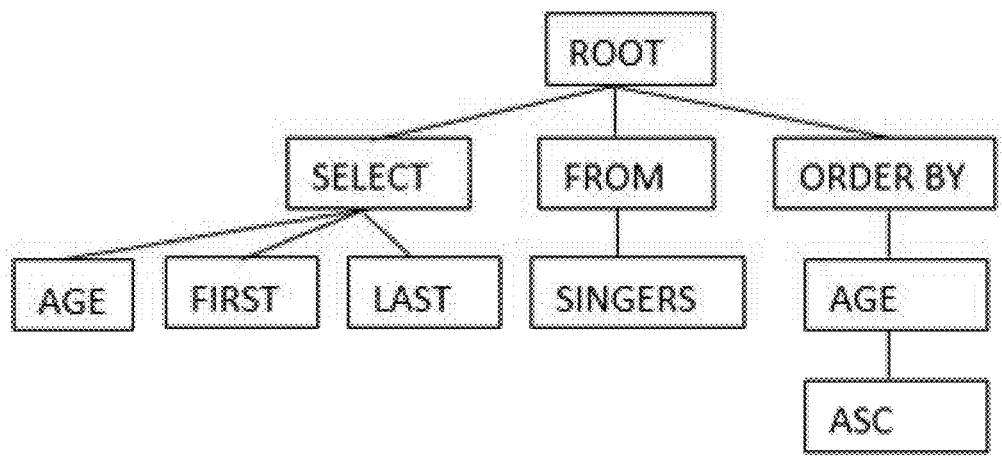
FIG. 1 illustrates a semantic representation of a structured database query according to example embodiments of the present disclosure.

Systems and methods discussed herein are directed to implementing a trained machine learning model, and more specifically training a machine learning model to convert an unstructured search query into a structured database query.

A learning model, according to example embodiments of the present disclosure, may be a defined computation algorithm executable by one or more processors of a computing system to perform tasks that include processing input having various parameters and outputting results. A learning model may be, for example, a layered model such as a deep neural network, which may have a fully-connected structure, may have a feedforward structure such as a convolutional neural network ("CNN"); may have a backpropagation structure such as a recurrent neural network ("RNN"); may further be structured having feedback loops within layers, such as a long short-term memory ("LSTM") neural network; and may or may have other architectures suited to the computation of particular tasks. Tasks may include, for example, classification, clustering, matching, regression, and the like.

According to example embodiments of the present disclosure, multiple learning models as described above may be connected to establish a sequence-to-sequence model. In general, a sequence-to-sequence learning model maps an input having multiple input elements to an output having multiple output elements, wherein the number of input elements may be different from the number of output elements. Due to this disparity, which is not necessarily deterministic, a sequence-to-sequence learning model may compute the conversion of the input to the output using an intermediate feature vector rather than computing the input directly. Processing the input to generate an intermediate feature vector therefrom may be performed using an attention model, which may include, for example, self-attention mechanisms and co-attention mechanisms, which shall be described in further detail subsequently.

A learning model according to example embodiments of the present disclosure may compute output conversion of an unstructured search query into a structured database query. An unstructured search query may be, for example, a query written in natural language, or a query otherwise not written according to a structured query language. These conversions (hereafter referenced as "unstructured-to-structured conversions") may perform functions such as backend processing in a search engine hosted as an information retrieval frontend for a database. In the context of a typical database management system ("DBMS"), the learning model may, for example, be part of a query processor module of the DBMS which may at least parse a structured database query, execute the structured database query, and return results of the query from the database to the information retrieval frontend. The learning model may, alternatively, be a separate component from the query processor module. A learning model may configure a computing system to receive an unstructured search query as input from an information retrieval frontend; execute the learning model to perform an unstructured-to-structured conversion upon the search query, outputting a structured database query based on a schema of a database of the DBMS. The structured database query may then be passed to the query processor, which may execute the database query and return results.

A learning model may be trained on a labeled training dataset, data records of the labeled training dataset including a known schema of a database; a structured database query based on the known schema; and an unstructured search query labeled as corresponding to the structured database query. A learning model trained in this manner according to example embodiments of the present disclosure may be executed by a computing system as a component of a DBMS to configure the computing system to accept database queries taking unstructured search queries as input, and return output which includes database search results retrieved by the query processor module executing a structured database query on the database.

Structured database queries may be constructed using a variety of syntactical variations while retaining a same semantic meaning and function upon execution by a query processor. Thus, for training datasets, it is desirable to normalize structured database queries which only differ trivially without impacting query processor execution. This may be performed by, first, parsing each structured database query into a semantic representation thereof, such as a syntax tree (for example, an abstract syntax tree "AST") as known to persons skilled in the art; and second, linearizing the semantic representation of the query into a string of structured query language tokens. For structured query language components, such as SQL clauses and statements, any default values of parameters not expressly specified by the original query as written may be expressly determined by parsing and are included in the semantic representation and the linearized string. Thus, all "invisible" elements of the original query as written (such as, by way of example, an ORDER BY clause in SQL being implicitly executed with ASC, or ascending, order in the event that no order is expressly written) are expressly represented. Moreover, for database schema components, such as field names, each such component is ordered in accordance with the corresponding database schema. Thus, arbitrary ordering of database schema components in the original query as written are uniformly ordered. By performing these two steps, different structured database queries having substantially the same semantic meaning may be represented uniformly, and thus normalized with regard to their representation to a learning model according to example embodiments of the present disclosure, minimizing the potential for trivial syntactical differences to influence computation by the learning model.

By way of example, the following two structured database queries have substantially the same semantic meaning:

SELECT FIRST, LAST, AGE FROM SINGERS ORDER BY AGE ASC

SELECT AGE, FIRST, LAST FROM SINGERS ORDER BY AGE

The ordering of the field names "FIRST," "LAST," and "AGE" in the SELECT clause is arbitrary and variation thereof does not cause the semantic meanings of the two queries to differ. The presence or absence of specifying "ASC" order in the ORDER BY clause also does not cause the semantic meanings of the two clauses to differ, since ASC order is the default for the ORDER BY clause.

FIG. 1 illustrates a semantic representation of a structured database query according to example embodiments of the present disclosure. In particular, FIG. 1 illustrates a common AST representation to both of the above structured database queries. The leafs "AGE," "FIRST," and "LAST" each having the same depth in the tree shows that their ordering with respect to each other is irrelevant to semantic meaning. The presence of "ASC" in the AST is also in common for both queries.

The AST of FIG. 1 may be linearized to the following string of tokens:

SELECT AGE, FIRST, LAST FROM SINGERS ORDER BY AGE ASC

Thus, ordering of the field names may be uniformly ordered (such as by alphabetical order) and optional parameters such as ASC may be made to expressly appear.

The learning model may receive unstructured search queries in the form of, for example, text strings. Generally, unstructured search queries may include interrogative phrases, which ask a question, and may include statement phrases which declare a subject of the query without being phrased as a question. Interrogative phrases and statement phrases may generally be search queries by lay person users of an information retrieval frontend of a database who wish to request information which is answerable by retrieving records from the database. The information retrieval frontend may be a server-hosted application which may not reveal the schema of the database to the user, in contrast to conventional database query frontends (which may reveal the schema of the database to the user and allow the user to construct a structured database query based on the database schema). For example, the information retrieval frontend may be a search engine text box on a webpage or mobile application, a voice user interface ("VUI") of a voice command device such as a smart speaker, home appliance, or automobile, and the like. Thus, the unstructured search queries are not referred to as database queries herein as the user may not be aware that the search query is querying a database.

Interrogative phrases and statement phrases in a database query context may include questions or statements requesting counts or other numerical summations of records in the database meeting certain criteria; such questions or statements may correspond to aggregate functions in the syntax of structured database queries. An interrogative phrase or statement phrases pertaining to a count aggregate function may be, for example, "what is the number of singers from the UK" or "number of singers from the UK," respectively, where records in the database may correspond to singers, which may be from the UK or from elsewhere. A count aggregate function may be constructed in a structured database query to return an aggregate over database records which meet this criterion.

Such questions may also correspond to group-by functions in the syntax of structured database queries. An interrogative phrase or statement phrase pertaining to group-by function may be, for example, "what is the number of singers in each country" or "number of singers in each country," respectively, where records in the database may correspond to singers from a number of different countries. A group-by function may be constructed in a structured database query to group records of singers from each country, so that aggregate functions may be executed separately on each group to obtain an aggregate over database records from each group.

Differences between interrogative phrases, statement phrases, and other similar phrases which request substantially similar information as described above may be reduced or eliminated by normalization according to example embodiments of the present disclosure, as shall be subsequently described.

A learning model may be trained to configure a computing system to compute a task taking feature vectors of unstructured search queries as input. A learning model according to example embodiments of the present disclosure may include an encoder module and a decoder module, where the encoder module is configured to tokenize input search queries and convert the tokens to feature vectors. With regard to search query input, features extracted therefrom are based on a particular schema of a particular database being queries (herein referred to as "schema feature(s)").

For example, with reference to a database queried by the interrogative phrases described above, a schema for the database records may, for example, include at least a first table containing records of individual singers, and a second table containing records of countries. Records of the "singers" table may include fields including at least a first ID field containing a numerical ID uniquely identifying the singer in the database, and a second ID field containing a numerical ID identifying a country from which the respective singer originates (where values of the second ID field need not be unique in the "singers" table). Records of the "countries" table may include fields including at least an ID field containing a numerical ID uniquely identifying a country, and a name field containing a text string identifying the name of each unique country. Other tables of the database and fields of records therein may be arbitrarily defined in any suitable manner known to persons skilled in the art of database management. For the purpose of retrieving results which answer the unstructured search queries described above according to example embodiments of the present disclosure, knowledge that the database schema includes these elements is sufficient.

Since the user making the unstructured search query does so without necessarily having any knowledge of the database schema, the unstructured database query does not necessarily inherently include schema features. Rather, by operation of an encoder which implements context mechanisms, schema features may be superimposed on an unstructured database query. A context mechanism according to example embodiments of the present disclosure may provide context strings, which may be additional text strings which state certain features of a schema of the queried database.

For example, a context string according to example embodiments of the present disclosure wherein one of the above unstructured search queries is an input may include the following:

sql keywords: . . . table singers:singer_id, country_id.countries:cid, name.types:number, string.foreign keys:fk1

Herein, following the token "table," "singers:singer_id, country_id" is the schema of the "singers" table as described above, and "countries:cid, name" is the schema of the "countries" table as described above. Furthermore, "types: number, string" may indicate that fields may contain numerical values or text string values.

Furthermore, "foreign keys: fk1" may provide a common reference between the fields which act as foreign keys by relate records between the two tables to be joined by a join function according to database query languages. In this case, the "fk1" reference may be used as a common reference to encode a relationship between "country_id" from the "singers" table and a unique "cid" from the "countries" table. In the event that the database schema includes additional pairs of tables being related by foreign keys, additional references such as "fk2," "fk3," and the like may be included herein to provide common references between each pair of foreign keys. The encoding of this information shall be described in more detail below.

Only a relevant portion of the context string is shown here, for the purpose of illustrating the relevant portions of the schema of the queried database, as described above. Omitted portions of the context string may, accordingly, reflect those portions of the schema of the queried database which are not described herein and are not necessary for understanding example embodiments of the present disclosure; likewise, the omitted portions of the context string are not necessary for understanding example embodiments of the present disclosure.

Figure 2A:
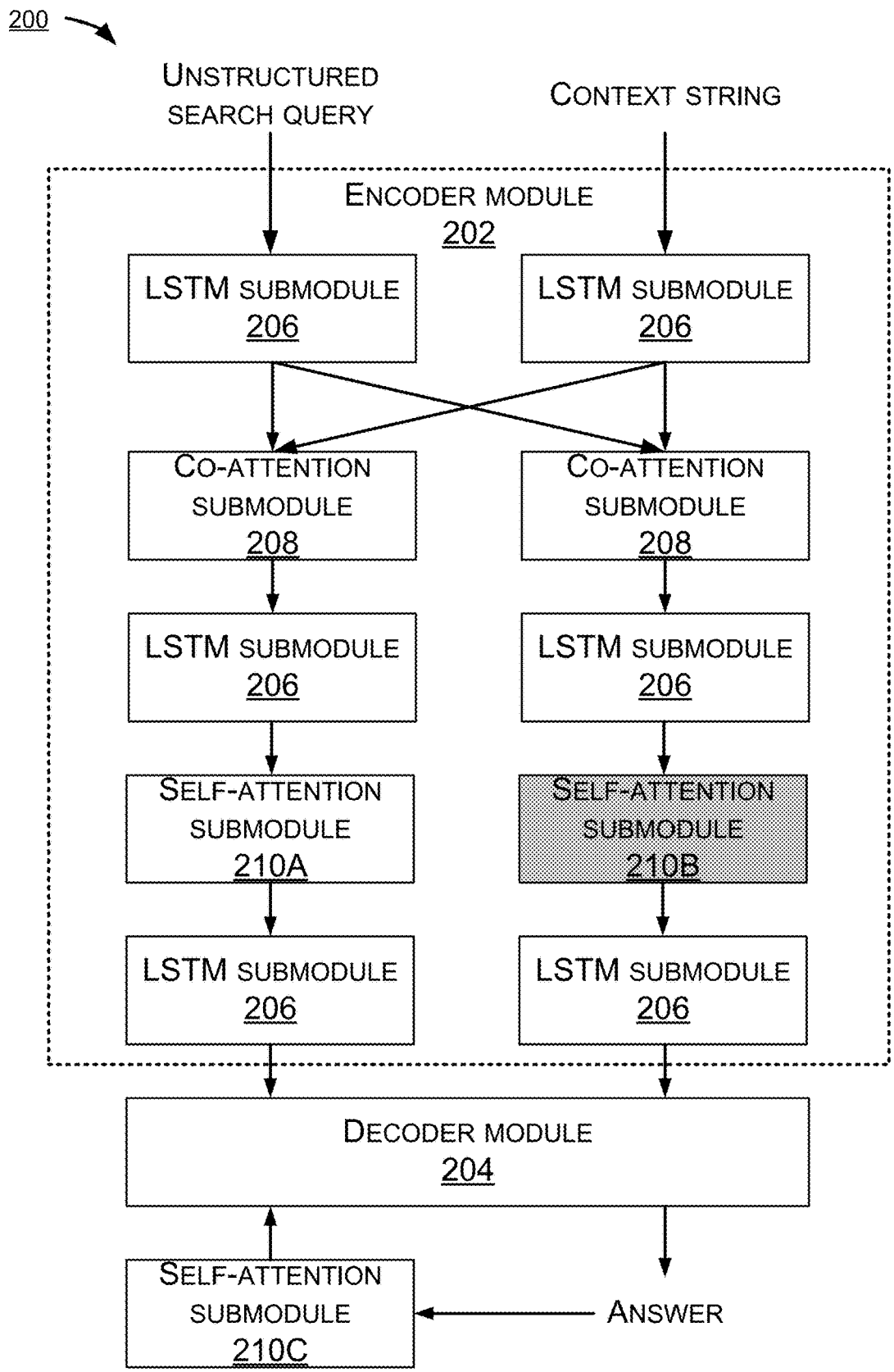
FIG. 2A illustrates a sequence-to-sequence model according to example embodiments of the present disclosure.

According to example embodiments of the present disclosure, the context string may be utilized by one or more learning models of a sequence-to-sequence model in implementing attention mechanisms, including self-attention mechanism and co-attention mechanisms, as described herein with reference to FIG. 2A.

FIG. 2A illustrates a sequence-to-sequence model 200 according to example embodiments of the present disclosure. Broadly, the sequence-to-sequence model 200 may include an encoder module 202 and a decoder module 204. The encoder module 202 describes a collection of submodules, each of which generally contributes to an overall function of the encoder module 202. According to example embodiments of the present disclosure, submodules of the encoder module 202 may generally contribute to generating an intermediate feature vector from an input unstructured search query. The decoder module 204 may be a single module converting the intermediate feature vector into an output structured database query.

Submodules of the encoder module 202 may include layered learning models including LSTM layers which include LSTM submodules 206, and attention layers which include attention submodules. Attention layers may further include a co-attention layer which includes co-attention submodules 208, and a self-attention layer which includes self-attention submodules 210. A LSTM layer may be an input layer of the overall sequence-to-sequence model 200, wherein a LSTM submodule 206 accepts an unstructured search query as input and another LSTM submodule 206 accepts a context string as input. LSTM submodules 206 may be trained (as shall be described subsequently) to tokenize a token of the unstructured search query, compute the token, process the token to a feature of a feature vector, and then propagate the tokenized search query to a next layer of the sequence-to-sequence model 200. LSTM submodules 206 may be trained (as shall be described subsequently) to tokenize a token of the context string, compute the token, process the token to a feature of a feature vector, and then propagate the tokenized context string to a next layer of the sequence-to-sequence model 200.

A co-attention layer may be interleaved between the LSTM layers. As the input LSTM layer has received multiple inputs, the search query and the context string, separate co-attention submodules 208 may each receive both the search query and context string as inputs; may compute co-attention for the search query by, in each layer of the co-attention submodule 208, up-weighing a token of the tokenized search query correspondingly with a token of the tokenized context string; and may compute co-attention for the context string by, in each layer of the co-attention submodule 208, up-weighing a token of the tokenized context string correspondingly with a token of the tokenized search query. The co-attention submodules 208 of the co-attention layer may then forward-propagate the co-attention-computed search query, and forward-propagate the co-attention-computed context string, to another LSTM layer.

Generally, co-attention propagated amongst layers of the sequence-to-sequence model 200 may enable the sequence-to-sequence model 200 to retain memory of which token of a search query corresponds to which token of a context string. For example, according to the above-mentioned examples of a search query and a context string, co-attention may be learned between the token "singers" of the search query and the tokens "singers" and "singer_id" of the context string, and co-attention may be learned between the token "UK" of the search query and the tokens "country_id," "countries," "cid," and "name" of the context string.

To train the sequence-to-sequence model 200 to perform the above computations, a labeled training dataset input into the sequence-to-sequence model 200 during training may include at least labeled correspondences between tokenized unstructured search queries and tokenized context strings, as well as labeled correspondences between individual tokens of those tokenized unstructured search queries and individual tokens of those corresponding tokenized context strings.

It should be understood that at this point, although the context string may be understood by human reviewers as representing the database schema, within the sequence-to-sequence model 200 the context string does not yet have the logic of the database schema encoded therein; that is, the context string does not encode any information regarding correspondences between fields, the types of those fields, the tables containing those fields, or foreign keys relating those tables with other tables. Operations of the encoder module 202 as described subsequently may act to encode this information.

The co-attention-computed search query and the co-attention-computed context string may both be computed separately, and may be computed in parallel, through separate LSTM submodules 206 of subsequent LSTM layers of the encoder module 202.

A self-attention layer may be further interleaved between the subsequent LSTM layers of the encoder module 202. Separate self-attention submodules 210A and 210B may each receive one of the co-attention-computed search query and the co-attention-computed context string, respectively, as input. Each self-attention submodule 210A and 210B may compute self-attention of the search query or the context string, respectively.

A self-attention submodule 210A or 210B may compute self-attention of the search query by, in each layer of the self-attention submodule 210A or 210B, up-weighing a token of the tokenized search query correspondingly with a previous token the tokenized search query. The self-attention submodule 210A or 210B may output a self-attention-computed search query.

To train the self-attention submodules 210A and 210B to perform the above computations, a labeled training dataset input into the self-attention submodule 210A or 210B during training may include at least labeled attention correspondences between tokens of tokenized unstructured search queries (i.e., in the form of an interrogative phrase or a statement phrase). For example, in the search query example given above, attention may be labeled at least between "what" and "number" to indicate that a number is being asked for, and between "number" and "singers" to indicate that a number of singers is being asked for. Generally, this training may be performed according to attention learning techniques as known to persons skilled in the art, and need not be described in further detail for understanding of example embodiments of the present disclosure.

A self-attention submodule 210B, in particular, may compute self-attention of the context string and encode information representing the database schema therein, outputting a self-attention-computed context string having a database schema encoded therein. This operation is described in more detail below.

According to example embodiments of the present disclosure, a self-attention submodule 210B may include structural attention heads trained across all tokens of a tokenized context string, as well as structural attention heads trained for each individual token of a tokenized context string. Structural attention heads may be weight vectors, wherein each feature of a weight vector corresponds to a different token of the tokenized context string.

A self-attention submodule 210B may be trained to learn structural attention heads trained across all tokens of a tokenized context string in order to encode attention amongst different tokens of the same context string. A self-attention submodule 210B may be trained to learn structural attention heads for each individual token of a tokenized context string in order to encode information regarding the database schema in the context string.

Figure 2B:
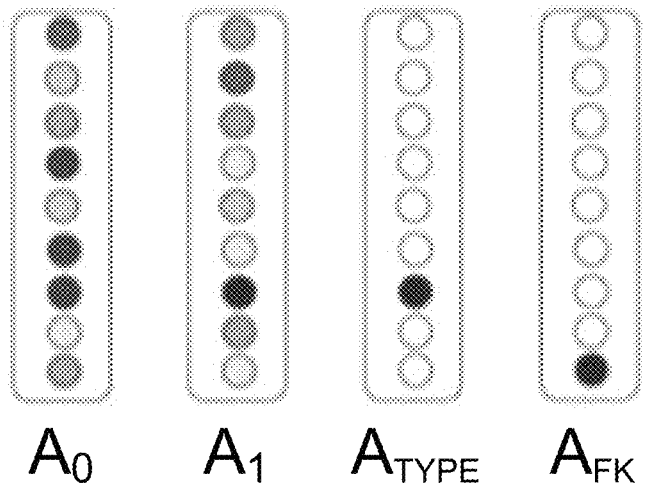
FIG. 2B illustrates structural attention heads of a self-attention submodule according to example embodiments of the present disclosure.

FIG. 2B illustrates structural attention heads of a self-attention submodule 210B as shaded in FIG. 2A according to example embodiments of the present disclosure. As illustrated in FIG. 2B, the weight vectors $A_0$ and $A_1$ are structural attention heads trained across all tokens of a tokenized context string, and the weight vectors $A_{type}$ and $A_{fk}$ are structural attention heads trained for each individual token of a tokenized context string. For the purpose of illustration, $A_0$ and $A_1$ as illustrated in FIG. 2B are trained across all tokens of the above example context string, and $A_{type}$ and $A_{fk}$ as illustrated in FIG. 2B are trained for the "country_id" token of the above example context string, in particular. Omitted tokens of the above context string are not illustrated here. Other $A_{type}$ and $A_{fk}$ weight sets trained for other individual tokens of the above example context string are not illustrated here.

$A_0$ and $A_1$ as illustrated in FIG. 2B show self-attention learned across tokens of the entire tokenized context string. As illustrated, $A_0$ may indicate learned attention between at least the tokens "countries," "cid," and "name" to indicate that the "countries" table includes the fields "cid" and "name." As illustrated, $A_1$ may indicate learned attention between at least the tokens "singers," "singer_id," and "country_id" to indicate that the "singers" table includes the fields "singer_id" and "country_id." Additional weight sets may be learned across tokens of the entire tokenized context string, without limitation thereto. More or fewer weight sets may be learned across tokens of the entire tokenized context string, depending on practical factors such as, for example, length of the tokenized context string (and thus complexity of the database schema), accuracy rates of trained results using different numbers of weight sets, and so on.

$A_{type}$ and $A_{fk}$ as illustrated in FIG. 2B show self-attention learned for individual tokens of the entire tokenized context string. As illustrated, $A_{type}$ may indicate that the type of the "country_id" field is a numerical value. As illustrated, $A_{fk}$ may indicate that the "country_id" field refers to a foreign key field in another table which refers back to "country_id" as a foreign key, and that both of these fields should have attention computed in common with the "fk1" token. As these associations would be predefined based on database schema and consistently labeled across the entire training dataset, the learned weight sets may be strongly weighted with low likelihood of error. Similarly, $A_{type}$ and $A_{fk}$ may be learned for each other token of the entire tokenized context string.

To train the self-attention submodule 210B to perform the above computations, a labeled training dataset input into the self-attention submodule 210B during training may include at least labeled attention correspondences between tokens of tokenized context strings. For example, in the search query example given above, attention may be labeled at least between "countries," "cid," and "name" to indicate that the "countries" table includes the fields "cid" and "name," and between "singers," "singer_id," and "country_id" to indicate that the "singers" table includes the fields "singer_id" and "country_id."

Applying the multiple structural attention heads, the self-attention submodule 210B may compute the tokenized context string C as follows to output the context string $C_{att}$ having the database schema encoded therein by a multi-head attention function MH( ):

$$C_{att} = MH(C)$$

$$MH(X) = [Att_1(X_1), \ldots, Att_n(X_n)]$$

$$Att_i(X_i) = \text{softmax}\left(\frac{K_i Q_i^T}{\sqrt{d}}\right) V_i$$

Where $Att_i$ denotes the following operation performed upon each structural attention head (weight set) $A_i$:

$$Att_{Feat}(V) = A_{Feat} V$$

$$A_{Feat}[i,j] = \begin{cases} 1, & \text{if } \text{Feat}(\text{token}_i) = \text{token}_j \\ 0, & \text{otherwise} \end{cases}$$

And $K_i$, $Q_i$, and $V_i$ denote, respectively, linear key, query, and value projections of the ith input state $X_i$ of the parameter X; V denotes a value projection of X; and d denotes a scaling factor.

The decoder module 204 may receive both the self-attention-computed search query and the self-attention-computed context string as input, which may be output from a last LSTM layer of encoder module 202. The decoder module 204 may be a LSTM which is a multi-pointer-generator. Generally, a multi-pointer-generator may compute the self-attention-computed search query and the self-attention-computed context string, applying the computed attention of each input, to output a structured database query. The multi-pointer-generator may output the structured database query by selecting between three choices for each part of the output: generating a string; copying from the search query; or copying from the context string.

Generating a string may be performed from a limited selection of strings which are expected to appear in structured database queries but are not expected to appear in the search query or the context string. For example, the SELECT clause in SQL and its predicates such as "SELECT . . . AS . . . " (to define an alias) and "SELECT . . . FROM . . . " (to specify a table) may be generated rather than copied. The JOIN clause in SQL and its predicates such as "JOIN . . . AS . . . " (to define an alias) and "JOIN . . . ON . . . " (to specify a field) may be generated rather than copied. Functions in SQL such as COUNT( ) may be generated rather than copied, though their parameters may be copied. The GROUP BY clause in SQL (to group multiple records meeting a common condition) may be generated rather than copied. The WHERE clause in SQL (to restrict records that another clause operates upon) may be generated rather than copied.

According to example embodiments of the present disclosure, generating a string may be based on the database schema as encoded in the self-attention-computed context string. For example, attention may be computed between a field name and "number," denoting that the type of the field is a numerical value. This type of attention may indicate that a WHERE clause may be generated which compares a value of the field to a particular numerical threshold. According to the above-mentioned example, numerical value fields are arbitrary, unique IDs rather than ranged numerical values; thus, according to other example embodiments of the present disclosure, field types encoded in the context string may distinguish between numerical ranges and non-ranged numbers.

Of course, attention computed between a field name and "string" may also indicate that a WHERE clause may be generated which compares a value of the field to a particular text string, as will be described below.

Furthermore, attention computed between a field name and a foreign key may indicate that the field references a field of another table, and thus may indicate that a JOIN . . . ON . . . clause may be generated referencing two field names that both have attention in common with a same foreign key reference (such as "fk1").

Copying from the search query or copying from the context string may each be performed by copying a token from, respectively, the tokenized search query or the tokenized contest string into the structured database query.

For each element of the structured database query, the decoded module 204 may determine whether to generate a string, copy from the search query, or copy from the context string by computing a probability of each: $p_v$, $p_c$, and $p_q$ denoting the probabilities of, respectively, generating a string, copying from the search query, and copying from the context string. According to example embodiments of the present disclosure, the distribution of these probabilities may be computed as follows:

$$p(w_t) = \gamma p_v(w_t) + (1-\gamma)[\gamma p_c(w_t) + (1-\lambda)p_q(w_t)]$$

The function $p(w_t)$ may be computed over an incrementing count t for each element of the structured database query, where $w_t$ is the structured database query as constructed up to t, and $\gamma$ and $\lambda$ are hyper-parameters of the decoder module 204 which control probabilities of generation and copying.

Output of a structured database query by the decoder module 204 may be based on minimizing output of a cost function by performing gradient descent computations. It is known in the art that a cost function may be any arbitrarily defined function based on output of the learning model, where output of the cost function represents degree of error in the output. Thus, for the decoder module 204 outputting a structured database query, the cost function may be defined to yield greater outputs, during training, for output queries which less accurately match a labeled corresponding target database query.

According to example embodiments of the present disclosure, gradient descent computations may seek to minimize output of the cost function. Upon the decoder module 204 outputting a structured database query, differences between errors output by the cost function from the output query and errors output by the cost function from labeled training data, and the search query, context string, and output query, may be input into another self-attention submodule 210C. This self-attention submodule 210C may re-compute self-attention of the search query and of the context string to adjust the values thereof based on the errors and the output query, and then feed the differences between errors output by the cost function from the output query and errors output by the cost function from labeled training data, and the search query, context string, and output query back to the decoder module 204 until the errors are minimized by gradient descent.

Subsequently, upon the cost function being minimized, the decoder module 204 may output the structured database query to a query processor. The query processor may then execute the structured database query on a database in accordance with operation of a DBMS as described above and as known to persons skilled in the art.

Based on the search query example given above, a structured database query may be:

SELECT COUNT(*) FROM SINGER AS T1 JOIN COUNTRIES AS T2 ON T1.COUNTRY_ID=T2.CID WHERE T2.NAME="UK"

Herein, "SELECT COUNT(*) FROM" may be generated based on the search query including "what is the number of," indicating that the search query should be answered with a numerical count of some number of records; "SINGER" may be copied from the context string as the name of the "singers" table corresponding to "singers" included in the search query, determined from co-attention; "AS T1" and "AS T2" may be generated to provide aliases for query construction purposes as known to persons skilled in the art; "JOIN" may be generated based on the search query including "from the UK," indicating that the search query requires records from the "countries" table (the association between "UK" and "countries" being inferred from training); "T1.COUNTRY_ID=T2.CID" being generated based on both "country_id" and "cid" being fields of different tables (determined from self-attention), both having self-attention with the foreign key "fk1"; and "WHERE T2.NAME="UK" may be generated based on the search query including "from the UK," which may be inferred as a possible value of the "countries" field from training.

To train the decoder module 204 to perform the above computations, a labeled training dataset input into the decoder module 204 during training may include at least tokenized unstructured search queries, tokens of which having self-attention labeled therebetween; tokenized context strings corresponding thereto, tokens of which having self-attention labeled therebetween; and structured database queries corresponding thereto both.

Example embodiments of the present disclosure may be implemented on server hosts and remote computing hosts. Server hosts may be any suitable networked server, such as cloud computing systems, which may provide collections of servers hosting computing resources such as an information retrieval frontend, a database, and a DBMS. Remote computing hosts such as data centers may host learning models to provide functions according to example embodiments of the present disclosure to convert unstructured search queries to structured database queries for the benefit of the hosted computing resources.

A cloud computing system may connect to various end devices which users may operate to access a hosted information retrieval frontend to input search queries therein so as to receive results to be output from the hosted computing resources. End devices may connect to the server hosts through one or more networks, such as edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources of the cloud computing system, such as cloudlets, fog nodes, and the like.

End devices may be any varieties of computing devices, such as personal computers, personal tablets, mobile devices, smart speakers, smart appliances, automobiles, and other such network-connected devices having input interfaces operative to input search queries by text, audio, handwriting, gesture, image, and other suitable forms.

Figure 3A:
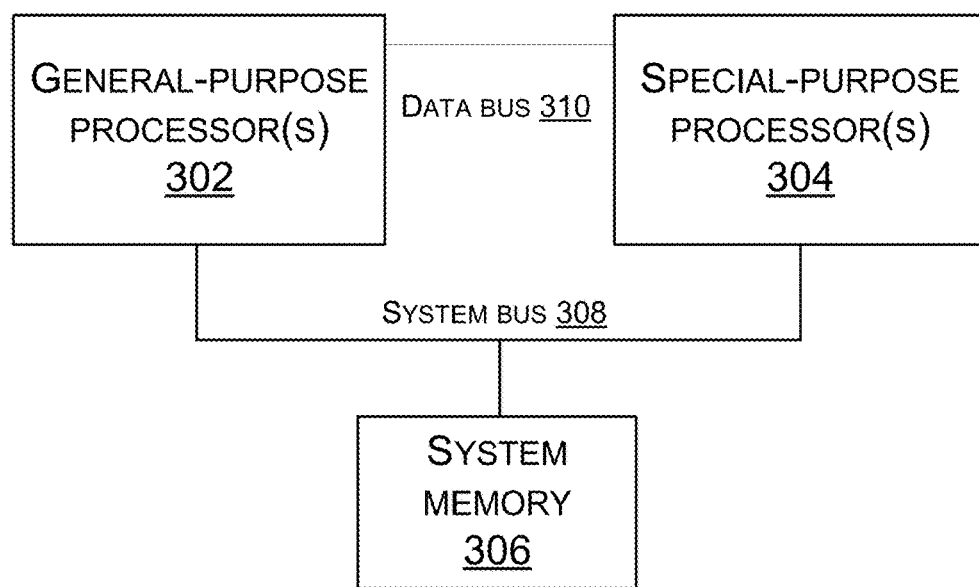
FIGS. 3A and 3B illustrate a system architecture of a system configured to compute source separation according to example embodiments of the present disclosure.
Figure 3B:
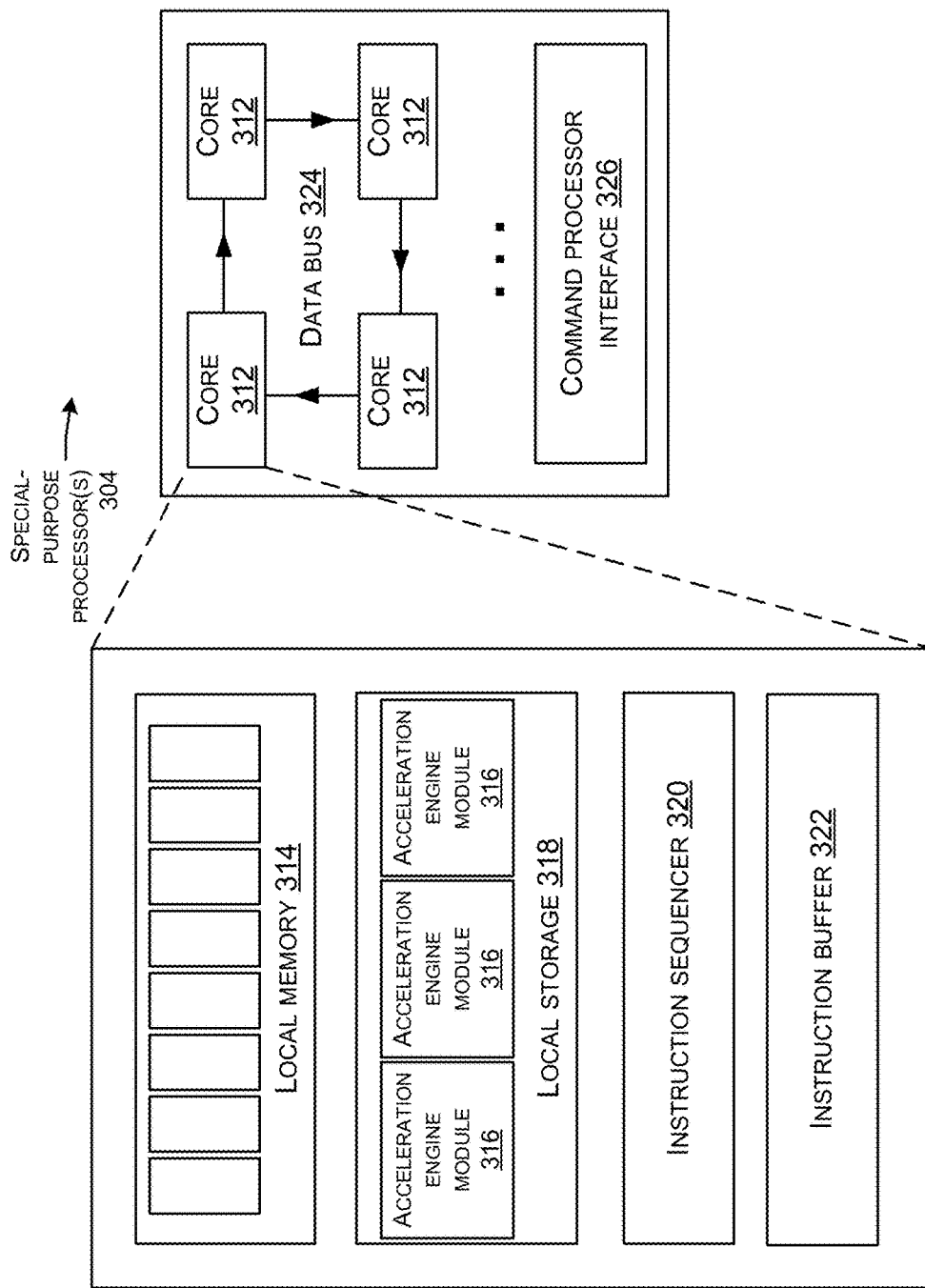

FIGS. 3A and 3B illustrate a system architecture of a system 300 configured to compute source separation according to example embodiments of the present disclosure.

A system 300 according to example embodiments of the present disclosure may include one or more general-purpose processor(s) 302 and one or more special-purpose processor(s) 304. The general-purpose processor(s) 302 and special-purpose processor(s) 304 may be physical or may be virtualized and/or distributed. The general-purpose processor(s) 302 and special-purpose processor(s) 304 may execute one or more instructions stored on a computer-readable storage medium as described below to cause the general-purpose processor(s) 302 or special-purpose processor(s) 304 to perform a variety of functions. Special-purpose processor(s) 304 may be computing devices having hardware or software elements facilitating computation of neural network computing tasks such as training and inference computations. For example, special-purpose processor(s) 304 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as training and inference, special-purpose processor(s) 304 may, for example, implement engines operative to compute mathematical operations such as matrix operations and vector operations.

A system 300 may further include a system memory 306 communicatively coupled to the general-purpose processor(s) 302 and the special-purpose processor(s) 304 by a system bus 308. The system memory 306 may be physical or may be virtualized and/or distributed. Depending on the exact configuration and type of the system 300, the system memory 306 may be volatile, such as RAM, non-volatile, such as ROM, flash memory, miniature hard drive, memory card, and the like, or some combination thereof.

The system bus 308 may transport data between the general-purpose processor(s) 302 and the system memory 306, between the special-purpose processor(s) 304 and the system memory 306, and between the general-purpose processor(s) 302 and the special-purpose processor(s) 304. Furthermore, a data bus 310 may transport data between the general-purpose processor(s) 302 and the special-purpose processor(s) 304. The data bus 310 may, for example, be a Peripheral Component Interconnect Express ("PCIe") connection, a Coherent Accelerator Processor Interface ("CAPI") connection, and the like.

FIG. 3B illustrates an example of special-purpose processor(s) 304, including any number of core(s) 312. Processing power of the special-purpose processor(s) 304 may be distributed among the core(s) 312. Each core 312 may include local memory 314, which may contain pre-initialized data, such as model weights, or data structures, such as constant buffers for batch normalization or quantization, for the performance of special-purpose computing. Each core 312 may further be configured to execute one or more sets of computer-executable acceleration engine modules 316 pre-initialized on local storage 318 of the core 312, which may each be executable by the core(s) 312, including execution in parallel by multiple core(s) 312, to perform or accelerate, for example, arithmetic operations such as matrix multiplication or matrix transposition, function operations such as convolution, or specially defined operations such as attention computation or generation/copying probability computation as defined herein. Each core 312 may further include an instruction sequencer 320, which receives and orders instructions received from an instruction buffer 322. Some number of core(s) 312, such as four, may be in communication by a data bus 324, such as a unidirectional ring bus. Software drivers controlling operation of each core 312 may control the core(s) 312 and synchronize their operations by sending executable commands through a command processor interface 326.

Unstructured search queries and context strings according to example embodiments of the present disclosure, or tokenized versions thereof, may be transported to special-purpose processor(s) 304 over a system bus 308 or a data bus 310, where learning model computation may be performed by the special-purpose processor(s) 304 on the unstructured search queries and context strings, or tokenized versions thereof, to perform encoder and decoder functions as described herein. Search queries may be input at an end device as described above, and transported over one or more networks through one or more server host(s) to a remote computing host.

Thus, example embodiments of the present disclosure propose sequence-to-sequence computation of unstructured search queries to output structured database queries, by attention computation thereof at an encoder and multi-pointer-generation computation thereof at a decoder, at one or more special-purpose processor(s) of a remote computing host.

Attention computation techniques, some as known to persons skilled in the art and some newly proposed herein, may generate memory regarding relationship and context of tokens of query strings and context strings, and may furthermore encode database structure and schema information in context strings. This information may enhance probability predictions by a multi-pointer-generator in outputting a structured database query.

Figure 4:
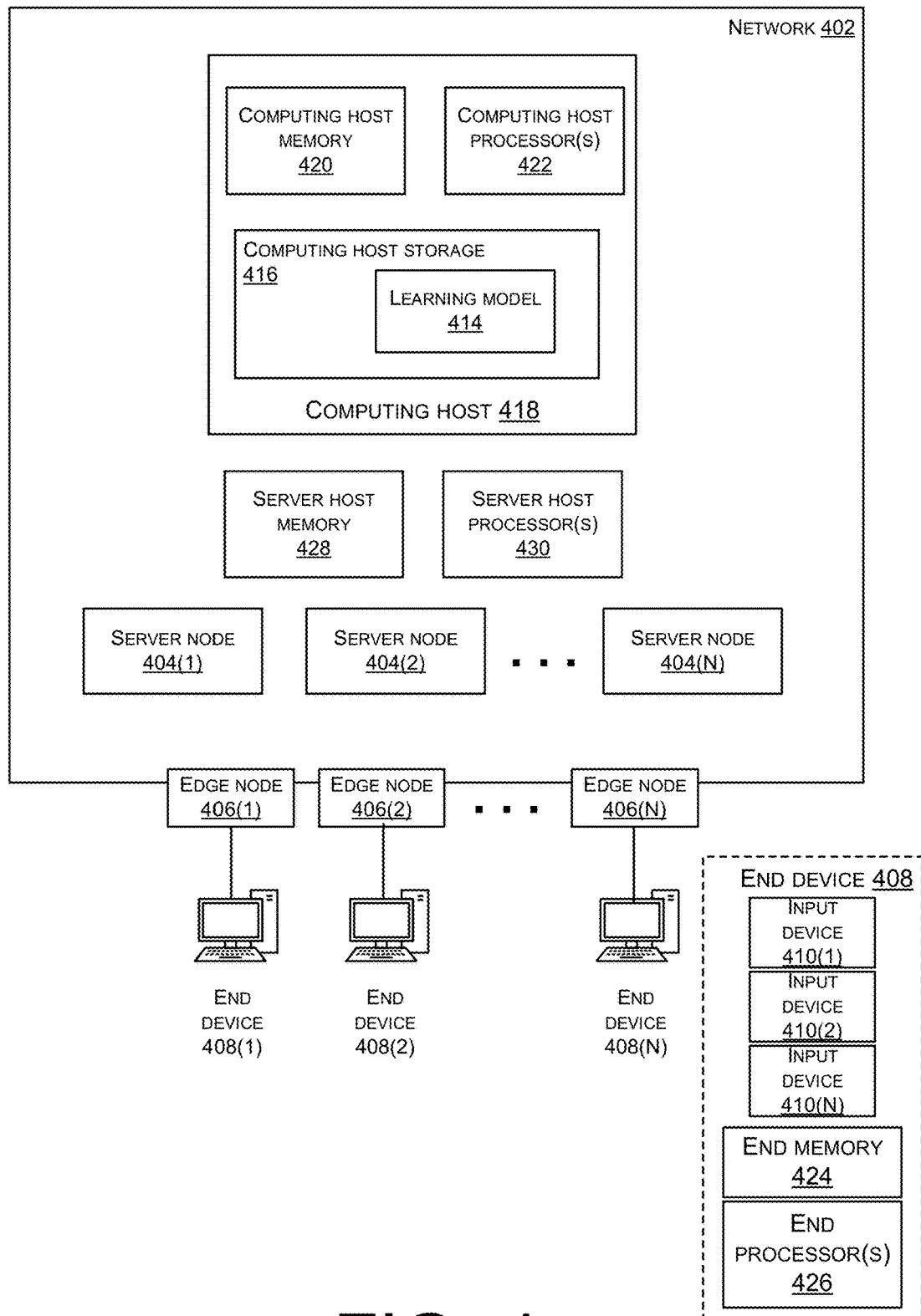
FIG. 4 illustrates an architectural diagram of server host(s) and a remote computing host for computing resources and a learning model according to example embodiments of the present disclosure.

FIG. 4 illustrates an architectural diagram of server host(s) 400 and a remote computing host for computing resources and a learning model according to example embodiments of the present disclosure. As described above, according to example embodiments of the present disclosure, a cloud computing system may be operative to provide server host functionality for hosting computing resources, supported by a remote computing host such as a data center hosting a learning model. Thus, this figure illustrates some possible architectural embodiments of computing devices as described above.

The server host(s) 400 may be implemented over a network 402 of physical or virtual server nodes 404(1), 404(2), . . . , 404(N) (where any unspecified server node may be referred to as a server node 404) connected by physical or virtual network connections. Furthermore, the network 402 terminates at physical or virtual edge nodes 406(1), 406(2), . . . , 406(N) (where any unspecified edge node may be referred to as an edge node 406) located at physical and/or logical edges of the network 402. The edge nodes 406(1) to 406(N) may connect to any number of end devices 408(1), 408(2), . . . 408(N) (where any unspecified end device may be referred to as an end device 408). An end device 408, such as, by way of example, end device 408(1), may collect captured data from any number of input devices 410(1), 410(2), . . . 410(N), where an input device may be, for example, a text, audio, handwriting, gesture, image, or other input device operative to collect unstructured search queries.

A learning model 414 implemented on a remote computing host accessed through an interface of the server host(s) 400 as described in example embodiments of the present disclosure may be stored on physical or virtual storage of a computing host 418 ("computing host storage 416"), and may be loaded into physical or virtual memory of the computing host 418 ("computing host memory 420") in order for one or more physical or virtual processor(s) of the computing host 418 ("computing host processor(s) 422") to perform computations using the learning model 414 to compute input data related to computing tasks as described herein. Computing host processor(s) 422 may be special-purpose computing devices facilitating computation of neural network computing tasks. For example, computing host processor(s) 422 may be one or more special-purpose processor(s) 404 as described above, including accelerator(s) such as Neural Network Processing Units ("NPUs"), Graphics Processing Units ("GPUs"), Tensor Processing Units ("TPU"), and the like.

According to example embodiments of the present disclosure, unstructured search queries captured at an end device 408 may be loaded into physical or virtual memory of the end devices 408 ("end memory 424") in order for one or more physical or virtual processor(s) ("end processor(s) 426") of the end devices 408 for transport to any of the edge nodes 406 for transport to any of the server nodes 404 and loaded into physical or virtual memory of the server host(s) 400 ("server host memory 428") in order for one or more physical or virtual processor(s) of the server host(s) 400 ("server host processor(s) 430") to perform preprocessing operations as described above.

Unstructured search queries according to embodiments of the present disclosure may be transported to the computing host 418 and utilized by the computing host processor(s) 422 to perform computations based on the learning model 414. According to example embodiments of the present disclosure, different submodules of a learning model as described above with reference to FIG. 2A may be executed by different processors of the computing host processor(s) 422 or may execute by a same processor of the computing host processor(s) 422 on different cores or different threads, and each submodule may perform computation concurrently relative to each other submodule.

Figure 5:
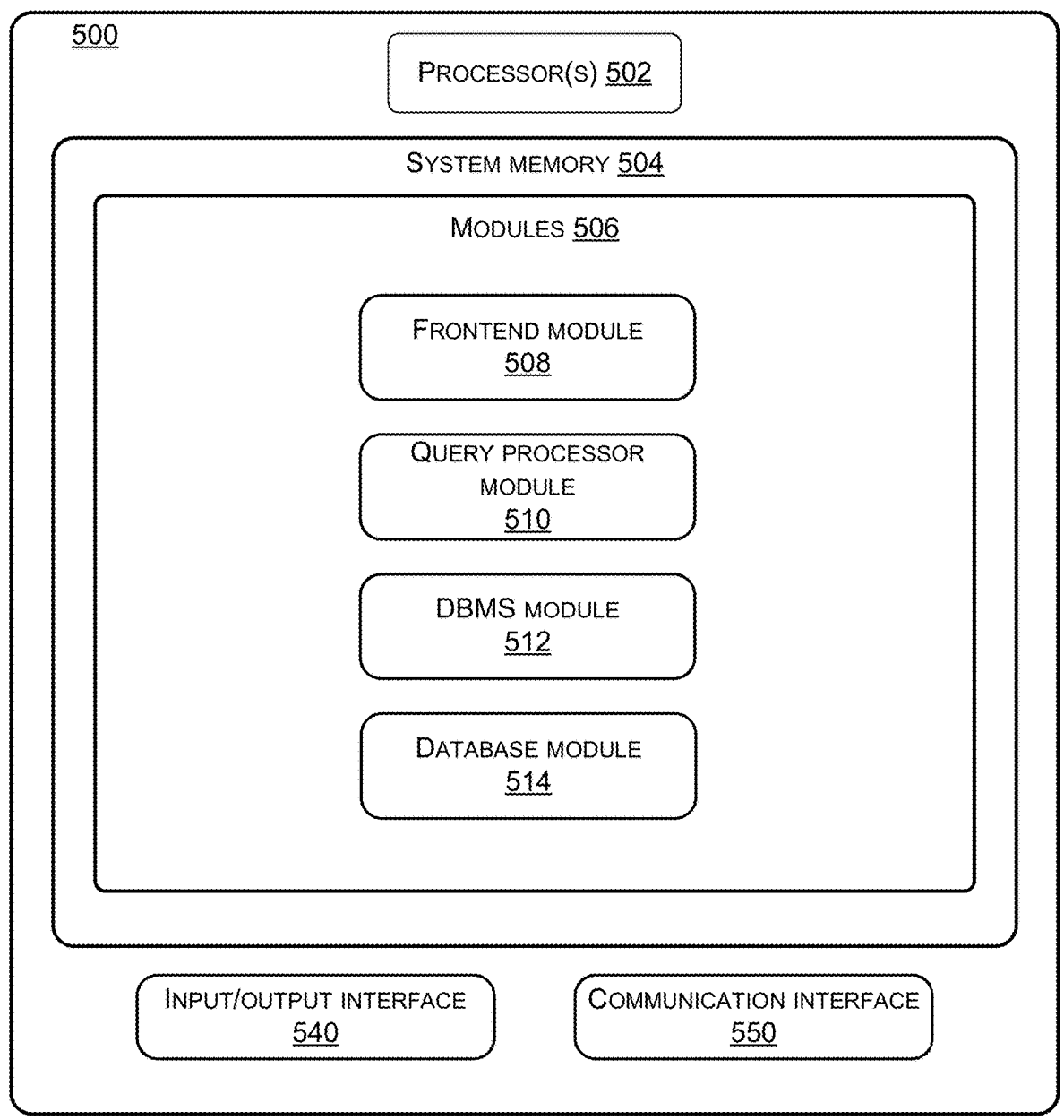
FIG. 5 illustrates an example computing system for implementing the processes and methods described above for implementing a database frontend and backend.

FIG. 5 illustrates an example computing system 500 for implementing the processes and methods described above for implementing a database frontend and backend.

The techniques and mechanisms described herein may be implemented by multiple instances of the computing system 500, as well as by any other computing device, system, and/or environment. The computing system 500, as described above, may be any varieties of computing devices, such as personal computers, personal tablets, mobile devices, smart speakers, smart appliances, automobiles, and other such network-connected devices having input interfaces operative to input search queries by text, audio, handwriting, gesture, image, and other suitable forms. The system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 500 may include one or more processors 502 and system memory 504 communicatively coupled to the processor(s) 502. The processor(s) 502 and system memory 504 may be physical or may be virtualized and/or distributed. The processor(s) 502 may execute one or more modules and/or processes to cause the processor(s) 502 to perform a variety of functions. In embodiments, the processor(s) 502 may include a central processing unit ("CPU"), a GPU, an NPU, a TPU, any combinations thereof, or other processing units or components known in the art. Additionally, each of the processor(s) 502 may possess its own local memory, which also may store program modules, program data, and/or one or more operating systems.

Depending on the exact configuration and type of the system 500, the system memory 504 may be volatile, such as RAM, non-volatile, such as ROM, flash memory, miniature hard drive, memory card, and the like, or some combination thereof. The system memory 504 may include one or more computer-executable modules 506 that are executable by the processor(s) 502. The modules 506 may be hosted on a network as services for a data processing platform, which may be implemented on a separate system from the system 500.

The modules 506 may include, but are not limited to, a frontend module 508, a query processor module 510, a DBMS module 512, and a database module 514.

The frontend module 508 may be configured to implement a hosted information retrieval frontend as described above.

The query processor module 510 may be configured to implement a query processor as described above, which may interface with a learning model as described subsequently.

The DBMS module 512 may be configured to implement a database management system as described above.

The database module 514 may be configured to implement and store a relational database as described above.

The system 500 may additionally include an input/output ("I/O") interface 540 and a communication module 550 allowing the system 500 to communicate with other systems and devices over a network, such as end devices as described above. The network may include the Internet, wired media such as a wired network or direct-wired connections, and wireless media such as acoustic, radio frequency ("RF"), infrared, and other wireless media.

Figure 6:
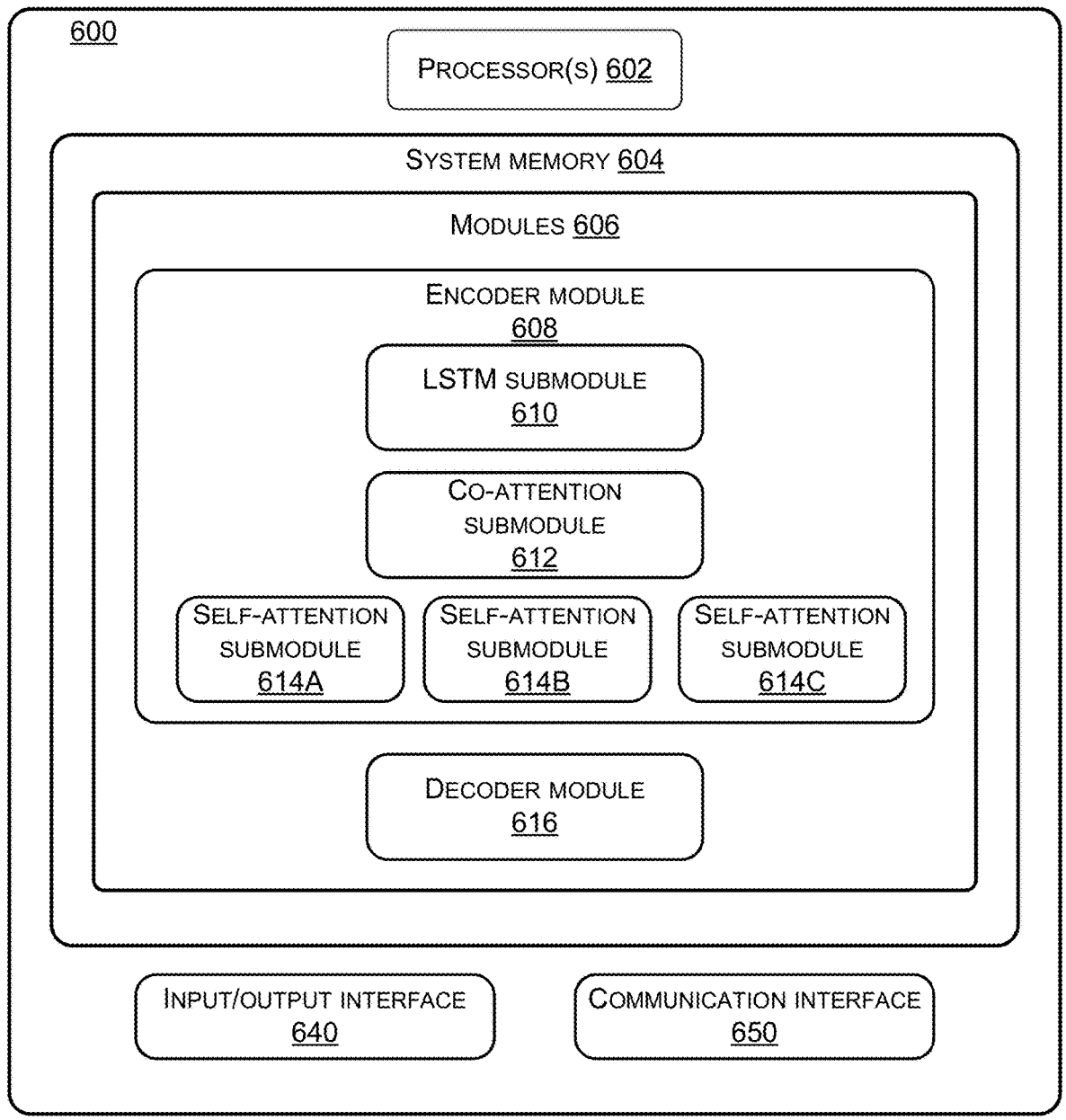
FIG. 6 illustrate an example computing system for implementing the processes and methods described above for implementing sequence-to-sequence query conversion techniques.

FIG. 6 illustrates an example computing system 600 for implementing the processes and methods described above for implementing source separation techniques for learning models.

The techniques and mechanisms described herein may be implemented by multiple instances of the system 600, as well as by any other computing device, system, and/or environment. The system 600 may be a distributed system composed of multiple physically networked computers or web servers, a physical or virtual cluster, a computing cloud, or other networked computing architectures providing physical or virtual computing resources as known by persons skilled in the art. Examples thereof include learning systems such as the computing host as described above with reference to FIG. 4. The system 600 shown in FIG. 6 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 600 may include one or more processors 602 and system memory 604 communicatively coupled to the processor(s) 602. The processor(s) 602 and system memory 604 may be physical or may be virtualized and/or distributed. The processor(s) 602 may execute one or more modules and/or processes to cause the processor(s) 602 to perform a variety of functions. In embodiments, the processor(s) 602 may include a central processing unit ("CPU"), a GPU, an NPU, a TPU, any combinations thereof, or other processing units or components known in the art. Additionally, each of the processor(s) 602 may possess its own local memory, which also may store program modules, program data, and/or one or more operating systems.

Depending on the exact configuration and type of the system 600, the system memory 604 may be volatile, such as RAM, non-volatile, such as ROM, flash memory, miniature hard drive, memory card, and the like, or some combination thereof. The system memory 604 may include one or more computer-executable modules 806 that are executable by the processor(s) 602. The modules 606 may be hosted on a network as services for a data processing platform, which may be implemented on a separate system from the system 600.

The modules 606 may include, but are not limited to, an encoder module 608, which further includes a LSTM submodule 610, a co-attention submodule 612, and a self-attention submodule 614; and a decoder module 616.

The encoder module 608 may be configured to perform overall functionality of generating an intermediate feature vector from an input unstructured search query as described above with reference to FIG. 2A.

The LSTM submodule 610 may be configured to perform tokenizing, computing, processing to a feature of a feature vector, and propagating to a next layer as described above with reference to FIG. 2A.

The co-attention submodule 612 may be configured to receive, compute co-attention for, and forward-propagate a search query and a context string, as described above with reference to FIG. 2A.

The self-attention submodules 614A, 614B, and 614C may be configured to receive, compute self-attention for, and forward-propagate a search query and a context string, respectively, as described above with reference to self-attention modules 210A, 210B, and 210C respectively, of FIG. 2A.

The decoder module 616 may be configured to perform multi-pointer-generator functionality to output a structured database query, as described above with reference to FIG. 2A.

The system 600 may additionally include an input/output ("I/O") interface 640 and a communication module 650 allowing the system 600 to communicate with other systems and devices over a network, such as systems 500 as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RANI"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides sequence-to-sequence conversion from unstructured search queries to structured database queries, so that lay persons may retrieve information from relational databases without specialized knowledge of database query languages. An encoder module and a decoder module of a learning model are trained to convert an unstructured search query to an intermediate feature vector by computing co-attention and self-attention based on a context string and a database schema, encoding the database schema in the context string by application of self-attention between the context string containing tokens of the database schema with learned structural attention heads which relate the token to logic of the database. Training is performed using labeled training datasets which include structured database queries which are normalized by parsing into a semantic representation thereof, followed by linearization.

Example Clauses

A. A method comprising: computing co-attention for a search query and a context string; computing self-attention for the search query; computing self-attention for the context string based on trained structural attention heads; computing the self-attention-computed search query and the self-attention-computed context string by a multi-pointer-generator; and outputting a structured database query.

B. The method as paragraph A recites, wherein the trained structural attention heads are learned using a training dataset comprising normalized labeled structural database queries.

C. The method as paragraph B recites, wherein the labeled structural database queries are normalized by parsing into semantic representations thereof.

D. The method as paragraph C recites, wherein the labeled structural database queries are further normalized by linearization into strings.

E. The method as paragraph A recites, wherein the trained structural attention heads comprise a plurality of structural attention heads trained across each token of a tokenized context string.

F. The method as paragraph A recites, wherein the trained structural attention heads comprise a plurality of structural attention heads each trained for an individual token of the tokenized context string.

G. The method as paragraph F recites, wherein each of the plurality of structural attention heads comprises a weight set indicating a data type of a field corresponding to the respective individual token.

H. The method as paragraph F recites, wherein each of the plurality of structural attention heads comprises a weight set indicating that the respective individual token is a foreign key.

I. A system comprising: one or more processors; and memory communicatively coupled to the one or more processors, the memory storing computer-executable modules executable by the one or more processors that, when executed by the one or more processors, perform associated operations, the computer-executable modules comprising: an encoding module further comprising: a co-attention submodule configured to compute co-attention for a search query and a context string; a first self-attention submodule configured to compute self-attention for the search query; and a second self-attention submodule configured to compute self-attention for the context string based on trained structural attention heads; and a decoder module configured to compute the self-attention-computed search query and the self-attention-computed context string by a multi-pointer-generator and output a structured database query.

J. The system as paragraph I recites, wherein the trained structural attention heads are learned using a training dataset comprising normalized labeled structural database queries.

K. The system as paragraph J recites, wherein the labeled structural database queries are normalized by parsing into semantic representations thereof.

L. The system as paragraph K recites, wherein the labeled structural database queries are further normalized by linearization into strings.

M. The system as paragraph I recites, wherein the trained structural attention heads comprise a plurality of structural attention heads trained across each token of a tokenized context string.

N. The system as paragraph I recites, wherein the trained structural attention heads comprise a plurality of structural attention heads each trained for an individual token of the tokenized context string.

O. The system as paragraph N recites, wherein each of the plurality of structural attention heads comprises a weight set indicating a data type of a field corresponding to the respective individual token.

P. The system as paragraph N recites, wherein each of the plurality of structural attention heads comprises a weight set indicating that the respective individual token is a foreign key.

Q. A computer-readable storage medium storing computer-readable instructions executable by one or more processors, that when executed by the one or more processors, cause the one or more processors to perform operations comprising: computing co-attention for a search query and a context string; computing self-attention for the search query; computing self-attention for the context string based on trained structural attention heads; computing the self-attention-computed search query and the self-attention-computed context string by a multi-pointer-generator; and outputting a structured database query.

R. The computer-readable storage medium as paragraph Q recites, wherein the trained structural attention heads are learned using a training dataset comprising normalized labeled structural database queries.

S. The computer-readable storage medium as paragraph R recites, wherein the labeled structural database queries are normalized by parsing into semantic representations thereof.

T. The computer-readable storage medium as paragraph S recites, wherein the labeled structural database queries are further normalized by linearization into strings.

U. The computer-readable storage medium as paragraph Q recites, wherein the trained structural attention heads comprise a plurality of structural attention heads trained across each token of a tokenized context string.

V. The computer-readable storage medium as paragraph Q recites, wherein the trained structural attention heads comprise a plurality of structural attention heads each trained for an individual token of the tokenized context string.

W. The computer-readable storage medium as paragraph V recites, wherein each of the plurality of structural attention heads comprises a weight set indicating a data type of a field corresponding to the respective individual token.

X. The computer-readable storage medium as paragraph V recites, wherein each of the plurality of structural attention heads comprises a weight set indicating that the respective individual token is a foreign key.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
computing co-attention for an unstructured search query and a context string to learn a correspondence between a token of the unstructured search query and a token of the context string;
computing self-attention for the unstructured search query to learn a correspondence between a plurality of tokens of the unstructured search query;
computing self-attention for the context string based on trained structural attention heads comprising at least a structural attention head trained across all tokens of the context string and a plurality of structural attention heads trained for each respective individual token of the context string, a structural attention head comprising a weight vector, wherein each feature of the weight vector corresponds to a different token of the context string;
computing the self-attention-computed search query and the self-attention-computed context string by a multi-pointer-generator; and
outputting a structured database query based on minimizing output of a cost function, causing a database management system to return results of the structured database query answering the unstructured search query.

2. The method of claim 1, wherein the trained structural attention heads are learned using a training dataset comprising normalized labeled structural database queries.

3. The method of claim 2, wherein the labeled structural database queries are normalized by parsing into semantic representations thereof.

4. The method of claim 3, wherein the labeled structural database queries are further normalized by linearization into strings.

5. The method of claim 1, wherein the trained structural attention heads comprise a plurality of structural attention heads trained across each token of a tokenized context string.

6. The method of claim 1, wherein the trained structural attention heads comprise a plurality of structural attention heads each trained for an individual token of the tokenized context string.

7. The method of claim 6, wherein each of the plurality of structural attention heads comprises a weight set indicating a data type of a field corresponding to the respective individual token or a weight set indicating that the respective individual token is a foreign key.

8. A system comprising:
one or more processors; and
memory communicatively coupled to the one or more processors, the memory storing computer-executable modules executable by the one or more processors that, when executed by the one or more processors, perform associated operations, the computer-executable modules comprising:
an encoding module further comprising:
a co-attention submodule configured to compute co-attention for an unstructured search query and a context string to learn a correspondence between a token of the unstructured search query and a token of the context string;
a first self-attention submodule configured to compute self-attention for the unstructured search query to learn a correspondence between a plurality of tokens of the unstructured search query; and a second self-attention submodule configured to compute self-attention for the context string based on trained structural attention heads comprising at least a structural attention head trained across all tokens of the context string and a plurality of structural attention heads trained for each respective individual token of the context string, a structural attention head comprising a weight vector, wherein each feature of the weight vector corresponds to a different token of the context string; and a decoder module configured to compute the self-attention-computed search query and the self-attention-computed context string by a multi-pointer-generator and output a structured database query based on minimizing output of a cost function, causing a database management system to return results of the structured database query answering the unstructured search query.

9. The system of claim 8, the trained structural attention heads are learned using a training dataset comprising normalized labeled structural database queries.

10. The method of claim 9, wherein the labeled structural database queries are normalized by parsing into semantic representations thereof.

11. The method of claim 10, wherein the labeled structural database queries are further normalized by linearization into strings.

12. The method of claim 8, wherein the trained structural attention heads comprise a plurality of structural attention heads trained across each token of a tokenized context string.

13. The method of claim 8, wherein the trained structural attention heads comprise a plurality of structural attention heads each trained for an individual token of the tokenized context string.

14. The method of claim 13, wherein each of the plurality of structural attention heads comprises a weight set indicating a data type of a field corresponding to the respective individual token or a weight set indicating that the respective individual token is a foreign key.

15. A computer-readable storage medium storing computer-readable instructions executable by one or more processors, that when executed by the one or more processors, cause the one or more processors to perform operations comprising:

computing co-attention for an unstructured search query and a context string to learn a correspondence between a token of the unstructured search query and a token of the context string;

computing self-attention for the unstructured search query to learn a correspondence between a plurality of tokens of the unstructured search query;

computing self-attention for the context string based on trained structural attention heads comprising at least a structural attention head trained across all tokens of the context string and a plurality of structural attention heads trained for each respective individual token of the context string, a structural attention head comprising a weight vector, wherein each feature of the weight vector corresponds to a different token of the context string;

computing the self-attention-computed search query and the self-attention-computed context string by a multi-pointer-generator; and outputting a structured database query based on minimizing output of a cost function, causing a database management system to return results of the structured database query answering the unstructured search query.

16. The computer-readable storage medium of claim 15, wherein the labeled structural database queries are normalized by parsing into semantic representations thereof.

17. The computer-readable storage medium of claim 16, wherein the labeled structural database queries are normalized by parsing into semantic representations thereof.

18. The computer-readable storage medium of claim 17, wherein the labeled structural database queries are further normalized by linearization into strings.

19. The computer-readable storage medium of claim 15, wherein the trained structural attention heads comprise a plurality of structural attention heads trained across each token of a tokenized context string.

20. The computer-readable storage medium of claim 15, wherein the trained structural attention heads comprise a plurality of structural attention heads each trained for an individual token of the tokenized context string.

* * * * *